United States Patent
Shah et al.

(10) Patent No.: US 11,258,706 B2
(45) Date of Patent: Feb. 22, 2022

(54) CALL ROUTING DISCOVERY FOR TELEPHONY NETWORKS

(71) Applicant: Optum, Inc., Minnetonka, MN (US)

(72) Inventors: Dhaval Shah, North Brunswick Township, NJ (US); Daniel Schley, Middlesex, NJ (US); Nicholas Leong, New Providence, NJ (US); Maulik Patel, Edison, NJ (US); Connor Power, King of Prussia, PA (US); Mihir Patel, North Brunswick Township, NJ (US); Robin Luo, Morristown, NJ (US); Somadev Pasala, Montclair, NJ (US); Donald Johnson, Newton, NJ (US)

(73) Assignee: Optum, Inc., Minnetonka, MN (US)

( * ) Notice: Subject to any disclaimer, the term of this patent is extended or adjusted under 35 U.S.C. 154(b) by 75 days.

(21) Appl. No.: 16/779,044

(22) Filed: Jan. 31, 2020

(65) Prior Publication Data

US 2021/0243119 A1 Aug. 5, 2021

(51) Int. Cl.
*H04L 12/721* (2013.01)
*H04L 12/24* (2006.01)
(Continued)

(52) U.S. Cl.
CPC ............. *H04L 45/68* (2013.01); *H04L 41/12* (2013.01); *H04L 45/02* (2013.01); *H04L 45/20* (2013.01)

(58) Field of Classification Search
CPC ......... H04L 45/68; H04L 45/20; H04L 45/02; H04L 41/12
See application file for complete search history.

(56) References Cited

U.S. PATENT DOCUMENTS 6,115,462 A 9/2000 Servi et al.
6,904,143 B1 6/2005 Peterson et al.
(Continued)

FOREIGN PATENT DOCUMENTS

CA 2447096 C 6/2018
WO 02093321 A3 11/2002

OTHER PUBLICATIONS

IEEE: An Expressive Simulator for Dynamic Network Flows; Pradeeban Kathiravelu, Luis Veiga, INESC-ID Lisboa, Instituto Superior T'ecnico, Universidade de Lisboa, Luis Veiga, 2015 (Year: 2015).*

(Continued)

*Primary Examiner* — Hassan A Phillips
*Assistant Examiner* — Mohammed S Chowdhury
(74) *Attorney, Agent, or Firm* — Shumaker & Sieffert, P.A.

(57) ABSTRACT

An example path discovery system includes a memory and processing circuitry in communication with the memory. The processing circuitry is configured to obtain routing script metadata associated with a telephony network, to parse routing logic implemented by one or more nodes of the telephony network, to emulate, using the routing script metadata and the parsed routing logic, a traversal path for a call through the telephony network, the emulated traversal path including the one more nodes for which the routing logic is parsed, to store, to the memory, the emulated traversal path and respective final states of runtime variables associated with the one or more nodes included in the emulated traversal path, and to generate, in a machine-readable format, one or more reports indicating a destination of the emulated traversal path in the telephony network and an ingress of the emulated traversal path with respect to the telephony network.

20 Claims, 8 Drawing Sheets

(51) Int. Cl.
*H04L 12/733* (2013.01)
*H04L 12/751* (2013.01)
*H04L 45/00* (2022.01)
*H04L 41/12* (2022.01)
*H04L 45/02* (2022.01)

(56) References Cited

U.S. PATENT DOCUMENTS

| | | | |
|---|---|---|---|
| 9,628,623 B2* | 4/2017 | Vymenets | G06Q 10/06 |
| 2004/0064549 A1* | 4/2004 | Brown | H04L 43/00 |
| | | | 709/224 |
| 2015/0117629 A1* | 4/2015 | Ristock | H04M 3/5232 |
| | | | 379/265.03 |
| 2015/0319086 A1* | 11/2015 | Tripathi | H04L 45/02 |
| | | | 370/254 |
| 2020/0045131 A1* | 2/2020 | Nigam | H04L 43/028 |
| 2020/0374389 A1* | 11/2020 | Martins da Costa | |
| | | | H04M 3/5166 |
| 2021/0168063 A1* | 6/2021 | D'Antoni | H04L 45/70 |

OTHER PUBLICATIONS

"About VIRSAE," virsae.com, retrieved from https://marketing.virsae.com/about-virsae/ on May 11, 2020, 3 pp.

"IVR Journey Analytics," nice.com, retrieved from https://www.nice.com/engage/nexidia-customer-engagement-analytics/customer-journey-solutions/call-volume-reduction/ivr-journey-analytics/ on May 11, 2020, 4 pp.

* cited by examiner

Table 1, Part 1

| TFN | CallTypeID | Node | Skills | Vector | dayOfWeek | time | ContactGroupID_ProviderTaxID(2,1,9) | ContactSourcesSystem(3,2,1) | PolicyNumber(3,3,7) |
|---|---|---|---|---|---|---|---|---|---|
| 8003185311 | 6721 | N11 | 1221:1287:1282 | 585 | | | 0 | ? | 0 |
| 8003185311 | 6834 | N11 | 1221:1287:1282 | 585 | | | 0 | ? | 0 |
| 8003185311 | 6721 | N11 | 1221:1287:1282 | 585 | | | 0 | ? | 0 |
| 8002014870 | 6721 | N1 | 1697:930:1692 | 616 | | | 0 | ? | 0 |
| 8002014870 | 6721 | N1 | 1697:930:1692 | 616 | | | 0 | ? | 0 |
| 8002014870 | 6834 | N1 | 1697:930:1692 | 616 | | | 0 | ? | 0 |
| 8002014870 | 6721 | N1 | 1697:930:1692 | 616 | | | 0 | ? | 0 |
| 8003185311 | 6834 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6834 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6834 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6721 | N11 | 1221:1287:1282 | 585 | | | 0 | ? | 0 |
| 8003185311 | 6834 | N11 | 1221:1287:1282 | 585 | | | 0 | ? | 0 |
| 8002014870 | 6721 | N1 | ... | 203 | | | 0 | ? | 0 |
| 8002014870 | 6721 | N1 | ... | 203 | | | 0 | ? | 0 |
| 8002014870 | 6721 | N1 | ... | 203 | | | 0 | ? | 0 |
| 8002014870 | 6721 | N1 | ... | 203 | | | 0 | ? | 0 |
| 8002014870 | 6721 | N1 | ... | 203 | | | 0 | ? | 0 |
| 8002014870 | 6834 | N1 | ... | 203 | | | 0 | ? | 0 |

FIG. 4A

Table 1, Part 2

| Routing Indicator | ProductCodeID(5, 19,5) | MembStateCode | ActionToExecute | CallerType | ProductType | QuestionType | Language | TOPSProductCode(8,30,3) | FinalApplicationName | BIECode_Campaign nCD(9,38,3) | VDN | Call_Volume |
|---|---|---|---|---|---|---|---|---|---|---|---|---|
| RXSTFNTEST | 0 | 0 XX | 0 | EM | HR | NA | E | ??? | ICNC2 | ??? | 3031532 | 361 |
|  | 0 | 0 XX | 0 | EM | HR | NA | E | ??? | ICNC2 | ??? | 3031532 | 361 |
|  | 0 | 0 XX | 0 | EM | HR | NA | E | ??? | ICNC2 | ??? | 3031532 | 361 |
| KEY000000000 | 0 | 0 XX | 0 | PV | OS | NN | E | ??? | SAXC2 | ??? | 3293.2 | 1 |
| KEY000000000 | 0 | 0 XX | 0 | PV | OS | NN | E | ??? | OXPS4 | OPI | 3293.2 | 1 |
| KEY000000000 | 0 | 0 XX | 0 | PV | OS | NN | E | ??? | OXPS4 | OPI | 3293.2 | 1 |
| RXSTFNTEST | 0 | 0 XX | 0 | PV | OS | NN | E | ??? | OXPS4 | OPI | 3293.2 | 1 |
|  | 0 | 0 XX | 0 | EM | HR | NA | E | ??? | ICNC2 | ??? | 3031531 | 19977 |
|  | 0 | 0 XX | 0 | NA | NA | NA | E | ??? | ICNC2 | ??? | 3031531 | 19977 |
|  | 0 | 0 XX | 0 | EM | HR | NA | E | ??? | ICNC2 | ??? | 3031531 | 19977 |
|  | 0 | 0 XX | 0 | EM | NA | NA | E | ??? | ICNC2 | ??? | 3031531 | 19977 |
| RXSTFNTEST | 0 | 0 XX | 0 | EM | NA | CS | E | ??? | ICNC2 | ??? | 3031531 | 19977 |
| RXSTFNTEST | 0 | 0 XX | 0 | EM | CB | CS | E | ??? | ICNC2 | ??? | 3031531 | 19977 |
|  | 0 | 0 XX | 0 | EM | NA | NA | E | ??? | ICNC2 | ??? | 3031531 | 19977 |
| RXSTFNTEST | 0 | 0 XX | 0 | EM | NA | NA | E | ??? | ICNC2 | ??? | 3031531 | 19977 |
| RXSTFNTEST | 0 | 0 XX | 0 | EM | HR | NA | E | ??? | ICNC2 | ??? | 3031531 | 19977 |
|  | 0 | 0 XX | 0 | EM | CB | NA | E | ??? | ICNC2 | ??? | 3031531 | 19977 |
|  | 0 | 0 XX | 0 | MM | NA | NA | E | ??? | ICNC2 | ??? | 3031531 | 19977 |
| RXSTFNTEST | 0 | 0 XX | 0 | MM | NA | CL | E | ??? | OXMS3 | ??? | 35436 | 7 |
| RXSTFNTEST | 0 | 0 XX | 0 | MM | RP | SE | E | ??? | OXMS3 | ??? | 35436 | 7 |
| KEY000000000 | 13778 | XX | 0 | MM | NA | NA | E | ??? | ICNC2 | ??? | 35436 | 7 |
| KEY000000000 | 0 | 0 XX | 0 | MM | NA | NA | E | ??? | OXMS3 | ??? | 35436 | 7 |
| RXSTFNTEST | 79044 | XX | 0 | MM | RP | RX | E | ??? | OXMS3 | ??? | 35436 | 7 |

FIG. 4B

Table 2, Part 1

| Node | VDN | Call_Volume | Skills | Vector | CallTypeID | dayOfWeek | time | ContactGroupID_Prov iderTaxID(2,19,) | ContactSource System(3,2,1) | PolicyNu mber(3,3,7) | RoutingIndicator |
|---|---|---|---|---|---|---|---|---|---|---|---|
| N1 | 32932 | 1 | 1697:930:1692 | | 616 | 6721/6814 | | 0 | ? | 0 | RXSTFNTEST/KEY00000000 |
| N11 | 3031532 | 351 | 1221:1287:1282 | | 585 | 6721/6814 | | 0 | ? | 0 | RXSTFNTEST/00000000000 |
| N11 | 3031531 | 19977 | 1221:1287:1282 | | 585 | 6721/6814 | | 0 | ? | 0 | RXSTFNTEST/00000000000 |
| N1 | 35436 | 7 | | | 203 | 6721/6814 | | 0 | ? | 0 | RXSTFNTEST/KEY00000820 |
| N1 | 35428 | 66 | 1728:1721: | | 1235 | 6721/6814 | | 0 | ? | 0 | KEY00000800 |
| N16 | 19936331075 | 1 | 864:867:824 | | 121 | 6721/6814 | | 0 | ? | 0 | RXSTFNTEST/KEY00880000 |

Table 2, Part 2

| ProductCode(5,19,3) | Mem berSt ateCo de | Action ToExec ute | CallerType | productType | QuestionType | Language | TOPSPro ductCod e(8,30,3) | FirstApplicationNam e | BIECode _Campai gnCD(3,3 8,3) |
|---|---|---|---|---|---|---|---|---|---|
| | 0 XX | 0 XX | 0 PV | OS | MN | E | ??? | SAXC2/OXPS4 | OP1 |
| | 0 XX | 0 XX | 0 EM | HR | NA | E | ??? | ICNC2 | ??? |
| | 0 XX | 0 XX | 0 EM/NA | NA/CB/HR | NA/CS | E | ??? | ICNC2 | ??? |
| 13778/13728/000000/79044/103288/133376/133308/11343 | 0 XX | 0 XX | 0 MM | NA/RP | NA/CS/CL/RF/RX/SE/EL | E | ??? | SAXC2/ICNC2/OXMS3 | OP1/??? |
| 13778/13728/000000/79044/103286/133376/133308/11343 | 0 XX | 0 XX | 0 MM | NA/RP | NA/CS/CL/RF/RX/SE/EL | E | ??? | SAXC2/ICNC2/OXMS3 | OP1/??? |
| | | | 0 PV | AP | NN | E | ??? | COMNE/OXPS4 | OP1 |

CALL ROUTING DISCOVERY FOR TELEPHONY NETWORKS

TECHNICAL FIELD

This disclosure relates to telephony systems, and particularly, to large-scale telephony networks that incorporate in-network call routing functionalities.

BACKGROUND

Various entities, such as enterprises, educational institutions, government agencies, etc. implement their own internal telephony networks. Telephony networks are scalable and can be expanded or contracted to accommodate different levels of complexity, depending on the needs of the implementing entity. Telephony networks of any scale often implement call routing technology. In many cases, call routing technology uses various features (or "conditions") of an incoming call to route the call to a particular agent or to a particular automated system. Call routing technology may be implemented entirely internally or may offload some decision-making functionalities to an external agent in some examples.

SUMMARY

Call routing technology may need to be replaced, migrated, upgraded, audited, or examined in various scenarios. One or more of these operations involve modeling of all possible call routes as a preprocessing step. Moreover, some telephony networks incorporate several call ingress nodes, such as in the form of multiple toll-free numbers (or "TFNs"). Depending on the scale of the implementing entity, the number of ingress nodes may number in the thousands, or even greater. Manually mapping calls exhibiting different conditions from the respective ingress node to the pertinent endpoint node is a labor-intensive process, particularly in cases of larger and/or more complex telephony networks.

In general, this disclosure describes systems configured to automate discovery of the control flow graph representing the infrastructure of a given telephony network. The systems of this disclosure perform a modified emulation of possible call routes within the telephony network and produce a structured abstraction of the emulation(s). The structured abstraction of the emulated call routes is filterable and queriable, and models potentially voluminous sets of possible paths within the telephony network. The structured abstraction produced by the systems of this disclosure are machine readable.

In one example, this disclosure describes a method. The method includes obtaining, by a path discovery system, routing script metadata associated with a telephony network, and parsing, by the path discovery system, routing logic implemented by one or more nodes of the telephony network. The method further includes emulating, by the path discovery system, using the routing script metadata and the parsed routing logic, a traversal path for a call through the telephony network, the emulated traversal path including the one or more nodes for which the routing logic is parsed. The method further includes storing, by the path discovery system, the emulated traversal path and respective final states of runtime variables associated with the one or more nodes included in the emulated traversal path, and generating, by the path discovery system, in a machine-readable format, one or more reports indicating a destination of the emulated traversal path in the telephony network and an ingress of the emulated traversal path with respect to the telephony network.

In another example, this disclosure describes a path discovery system that includes a memory and processing circuitry in communication with the memory. The processing circuitry is configured to obtain routing script metadata associated with a telephony network, and to parse routing logic implemented by one or more nodes of the telephony network. The processing circuitry is further configured to emulate, using the routing script metadata and the parsed routing logic, a traversal path for a call through the telephony network, the emulated traversal path including the one more nodes for which the routing logic is parsed. The processing circuitry is further configured to store, to the memory, the emulated traversal path and respective final states of runtime variables associated with the one or more nodes included in the emulated traversal path, and to generate, in a machine-readable format, one or more reports indicating a destination of the emulated traversal path in the telephony network and an ingress of the emulated traversal path with respect to the telephony network.

In another example, this disclosure describes an apparatus for path discovery. The apparatus includes means for obtaining routing script metadata associated with a telephony network, means for parsing routing logic implemented by one or more nodes of the telephony network, means for emulating, using the routing script metadata and the parsed routing logic, a traversal path for a call through the telephony network, the emulated traversal path including the one more nodes for which the routing logic is parsed, means for storing the emulated traversal path and respective final states of runtime variables associated with the one or more nodes included in the emulated traversal path, and means for generating, in a machine-readable format, one or more reports indicating a destination of the emulated traversal path in the telephony network and an ingress of the emulated traversal path with respect to the telephony network.

In another example, this disclosure describes a non-transitory computer-readable storage medium encoded with instructions that, when executed, cause processing circuitry of a path discovery system to obtain routing script metadata associated with a telephony network, to parse routing logic implemented by one or more nodes of the telephony network, to emulate, using the routing script metadata and the parsed routing logic, a traversal path for a call through the telephony network, the emulated traversal path including the one more nodes for which the routing logic is parsed, to store, to the non-transitory computer-readable storage medium, the emulated traversal path and respective final states of runtime variables associated with the one or more nodes included in the emulated traversal path, and to generate, in a machine-readable format, one or more reports indicating a destination of the emulated traversal path in the telephony network and an ingress of the emulated traversal path with respect to the telephony network.

The systems of this disclosure provide one or more technical improvements and/or advantages. The automated control graph discovery of this disclosure may provide a machine-readable, filterable, and queriable structured abstraction of most, if not all, of the possible call routes within a given telephony network, thereby enabling migrations or other programmatic transformations to aspects of the telephony network. By traversing and mapping most or all of the possible paths in a telephony network, the systems of this disclosure improve data precision with respect to call route discovery. By pruning the set of mapped traversal paths to remove trivially different traversal paths, the systems of this disclosure reduce the computational resource overhead incurred in call route discovery. The machine-readable, filterable, queriable output to abstract the set of mappings enables automation of migration, analysis, etc. with respect to the telephony networks that are presently in place. The systems of this disclosure are scalable, and can traverse and map call paths in telephony networks of widely divergent sizes and complexity.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A & 4B illustrate an excerpt of an uncollapsed or expanded version of a path analysis report generated by the path discovery system of FIG. 1.

DETAILED DESCRIPTION

Figure 1:
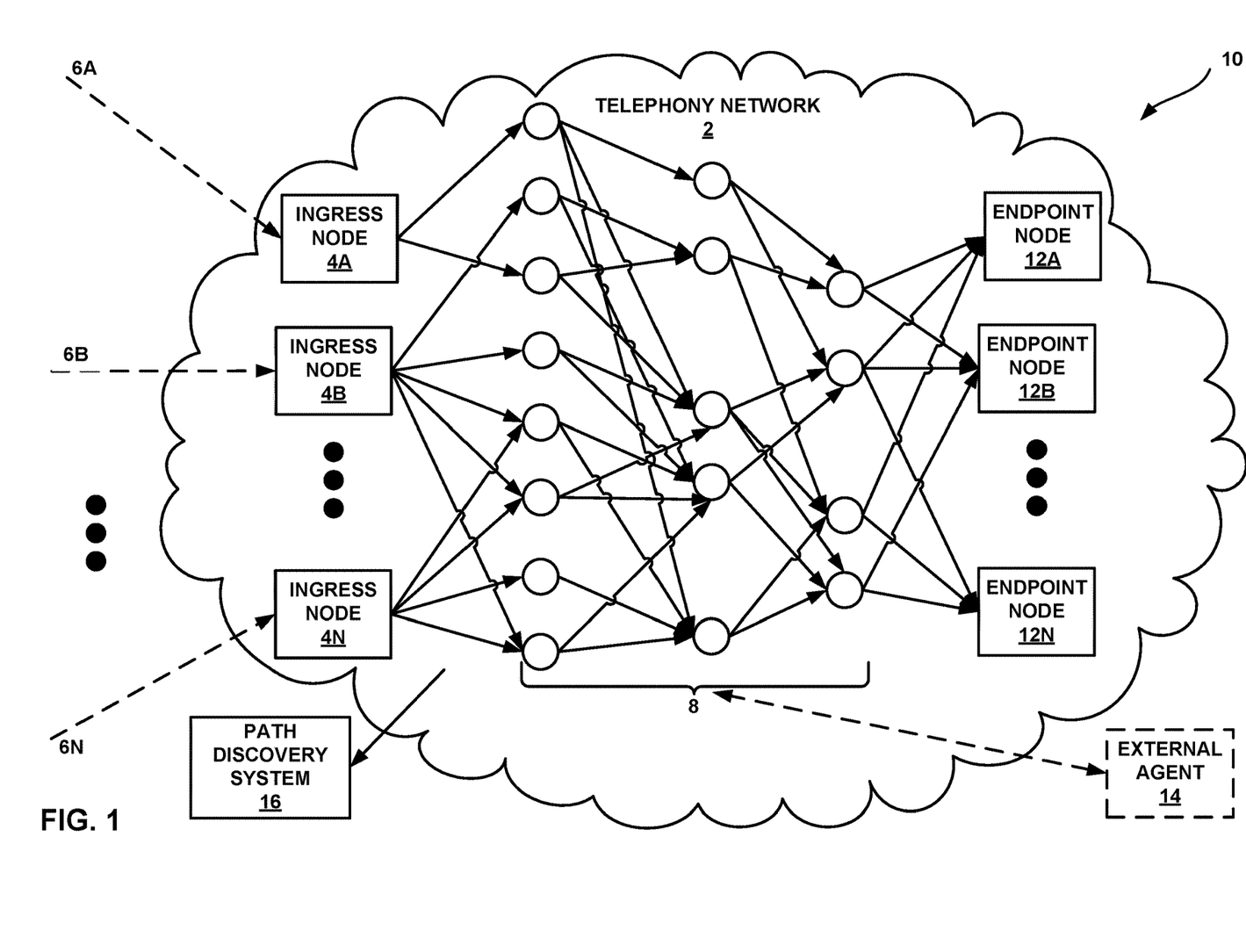
FIG. 1 is a conceptual diagram illustrating a system in which the call routing path discovery techniques of this disclosure may be implemented.

FIG. 1 is a conceptual diagram illustrating a system 10 in which the call routing path discovery techniques of this disclosure may be implemented. System 10 includes a telephony network 2 and a path discovery system 16, the latter of which represents a device or a group of devices configured to perform the path discovery techniques of this disclosure. Telephony network 2 may incorporate any one or more of a fixed-line private branch exchange (PBX), a mobile PBX, an internet protocol PBX (IP PBX), a virtual PBX system, which incorporates aspects of computer telephony integration (CTI), or other types of multiline telephone systems. Telephony network 2 may incorporate connections that conform to various types of interface standards, such as plain old telephone service (POTS), session initiation protocol (SIP), IP, the integrated services digital network (ISDN) standard, voice over IP (VoIP), and various others. Aspects of telephony network may conform to or simulate aspects of wide area telephone service (WATS), to incorporate toll-free number (TFN) support. In some use-case scenarios, telephony network 2 represents a phone network administrated and used by a midsized or large entity, such as an enterprise, an educational institutional, a governmental agency, etc.

Telephony network 2 includes ingress nodes 4A-4N (collectively, "ingress nodes 4"). Ingress nodes 4 represent physical and/or intake ports for incoming calls originating outside of telephony network 2, with a connection destination positioned within telephony network 2. As such, ingress nodes 4 represent entry points for incoming calls 6A-6N (collectively, "incoming calls 6") with respect to telephony network 2. In some examples, ingress nodes 4 represent or simulate inward WATS (or IN-WATS) services that accept incoming calls 6 via calls to TFNs. It will be appreciated that, in practice, ingress nodes 4 may service large numbers of TFNs, sometimes in the order of thousands, tens or thousands, or greater. As such, telephony network 2 has been simplified for ease of illustration in the example of FIG. 1.

Each of incoming calls 6 is described herein as having or exhibiting a number of "conditions." As used herein, the respective set of conditions associated with any of incoming calls 6 indicates a destination (or pool of eligible destinations) for the particular incoming call 6. For example, the set of conditions associated with any of incoming calls 6 may map to a designated pool of agents with a certain combination of qualifications. Examples of such qualifications may include, but are not limited to, any one or more of linguistic proficiency, subject matter expertise, authorization to perform certain functions, and others.

Telephony network 2 includes a number of intermediate hops, to which ingress nodes 4 may relay incoming calls 6 for further processing and forwarding. These intermediate hops of telephony network 2 are shown in the form of intermediate nodes 8. Intermediate nodes 8 collectively implement a control flow graph to deterministically pipeline each of incoming calls 6 to a destination node of telephony network 2. As such, each of intermediate nodes 8 may represent an individual unit of a computational stage, regardless of whether two or more of intermediate nodes 8 are implemented in consolidated hardware.

Each of intermediate nodes 8 represents an individual decision node in an overall decision tree. For example, each of intermediate nodes 8 may parse aspects of one or more of incoming calls 6 to determine whether the particular incoming call 6 presently under examination exhibits an individual condition or not. For example, each of intermediate nodes 8 may execute logic that forms an individual step of an if-else-if ladder. In this example, each intermediate node 8 executes a conditional construct to determine whether a Boolean condition is true or false. Depending on the binary true/false outcome of the respective conditional construct that was executed, each intermediate node 8 modifies the control flow of the respective incoming call 6 through telephony network 2.

Each individual control flow of telephony network terminates at one of endpoint nodes 12A-12N (collectively, "endpoint nodes 12"). That is, the control flow logic implemented by ingress nodes 4 and intermediate nodes 8 routes each of incoming calls 6 to one of endpoint nodes 12. Each of endpoint nodes 12 may be associated with an agent or group of agents. For example, the control flow logic of telephony network 2 may parse each of incoming calls 6 on a condition-by-condition basis, and route each incoming call 6 to the particular endpoint node 12 that is associated with the agent(s) predesignated as having a skill set that maps to the full set or a substantial subset of conditions parsed from the respective incoming call 6. Examples of condition sets may include linguistic proficiency, subject matter expertise, authorization level, and several others.

In some examples, one or more intermediate nodes 8 may offload some or all of the implemented control flow logic to devices positioned outside of telephony network 2. External agent 14 of FIG. 1 represents either a standalone computing device or a distributed computing system that implements portions or all of the conditional logic ascribed above to intermediate nodes 8. In various examples, external agent 14 may be operated by the same entity that operates telephony network 2 or by a different (e.g., third party) entity. External agent 14 is an optional component of system 10, and is therefore illustrated in FIG. 1 using dashed-line borders.

System 10 also includes path discovery system 16. Path discovery system 16 represents a standalone computing device or a distributed computing system that implements routing path discovery over telephony network 2, in accordance with aspects of this disclosure. Path discovery system 16 may be configured to extract one or more of backbone logic, runtime traces, post-runtime variable states, node-specific logic, etc. from components of telephony network 2 to implement the path discovery techniques of this disclosure. Backbone logic may refer to some or all of the overall decision tree implemented over telephony network 2, and runtime traces may refer to information tracked activities during program/process execution. Post-runtime variable states may refer to values assigned to a variable at any of ingress nodes 4 or intermediate nodes 8 after any of incoming calls 6 has egressed from the respective ingress node 4 or intermediate node 8, and node-specific logic may refer to decision logic implemented at any one of ingress nodes 4 or intermediate nodes 8 in forwarding any of incoming calls 6 to a next hop. While path discovery system 16 is described herein as performing the path discovery techniques of this disclosure in particular phases and sub-stages, it will be appreciated that path discovery system 16 may perform the various portions of the path discovery process in various sequences, including partially or fully parallelized manners, in various use case scenarios that are consistent with aspects of this disclosure.

During a routing path discovery stage referred to herein as an "ingestion phase," path discovery system 16 may obtain routing script metadata from one or more control flow sources associated with telephony network 2. The control flow sources may include one or more of ingress nodes 4, or may represent a computing device or distributed system that provides script metadata to ingress nodes 4 and/or intermediate nodes 8. The routing script metadata may provide an overall outline (or "schema") with respect to call routing through telephony network 2, based on a pipelined progression of deterministic computational operations. The script metadata forms the backbone of the control flow logic that telephony network 2 implements to route incoming calls 6 from ingress nodes 4 to endpoint nodes 12.

As part of the ingestion phase, path discovery system 16 may also obtain logs and final states of runtime variables (at various points of telephony network 2) from the control flow source. Because ingress nodes 4 and intermediate nodes 8 implement binary switching operations to deterministically forward each of incoming calls 6 to a downstream node, each of ingress nodes 4 and intermediate nodes 8 has a final runtime variable state after forwarding each respective incoming call 6 to the next hop. The final runtime variable state refers to the variables that are used in ingress nodes 4 and intermediate nodes 8 to indicate decision outcomes, such as "callerType=Member" or "Language=English."

Path discovery system 16 may ingest these final runtime variable states to use in driving traversal during the "traversal phase" that is described below in greater detail. The form of the final runtime variable states assists in determining whether "true" or "false" should be assigned at each respective node of ingress nodes 4 and intermediate nodes 8. Path discovery system 16 sources the final runtime states from the logs, which path discovery system 16 may track from the pertinent ones of endpoint nodes 12. The final state of a variable as of a given endpoint node 12 is logged with the following information: call source (pertaining to the respective incoming call 6), the respective ingress node 4, the respective destination endpoint node 12, and the final values of the variables that were used within the routing logic implemented by ingress nodes 4 and intermediate nodes 8.

The ingestion phase enables path discovery system 16 to determine the next-hop information of each node of the traversal path. Path discovery system 16 may collect the post-runtime variable states of ingress nodes 4 and intermediate nodes 8, thereby logging the result of each conditional statement-based decision implemented at ingress nodes 4 and intermediate nodes 8 after processing any individual incoming call 6 during the "traversal phase" which is described in greater detail below.

In instances in which path discovery system 16 obtains the post-runtime variable states of ingress nodes 4 and intermediate nodes 8, path discovery system 16 may use the post-runtime variable states to supplement the script metadata. For instance, if one or more of intermediate nodes 8 use external agent 14 to implement control flow decisions, then the script metadata pertaining to telephony network 2 may not include the actual logic implemented for those particular intermediate nodes 8. For example, the script metadata may include a reference to external agent 14, without including the actual logic that external agent 14 (which is operated by a different entity in some examples) implements for the offloaded hops. In these examples, path discovery system 16 may populate the post-runtime variable states at the respective intermediate nodes 8 to reverse-engineer the decision logic implemented by external agent 14 in place of these particular intermediate nodes 8.

Upon completion of the ingestion phase, path discovery system 16 performs a routing path discovery stage referred to herein as a "logic parsing phase." During the logic parsing phase, path discovery system 16 may parse the in-node routing logic implemented at each of ingress nodes 4 and intermediate nodes 8, and output the logic tree in the form a control flow graph (e.g., in code or pseudocode) in machine-readable format. For example, path discovery system 16 may use a combination of the routing script metadata and the variable values of the post-call logs to discern the in-node routing logic implemented at each of ingress nodes 4 and intermediate nodes 8.

In examples of one or more of intermediate nodes 8 implementing Boolean conditional logic, path discovery system 16 models the "true" path and the "false" path exiting each respective intermediate node 8. Upon parsing the in-node routing logic across all of ingress nodes 4 and intermediate nodes 8, path discovery system 16 consolidates all of the in-node routing logic to form a control flow graph. Path discovery system 16 may derive the control flow graph from code or pseudocode that is machine-readable in an (at least partially) platform-agnostic way. In various examples, path discovery system 16 may construct the control flow graph from a script in a scripting or programming language, such as JavaScript or in other scripting or programming languages.

Upon completing the logic parsing phase by outputting the control flow graph in machine-readable format, path discovery system 16 performs a routing path discovery stage referred to herein as a "traversal phase." The traversal phase itself includes two stages, which are termed as an "emulation" stage and a "tracing" stage. Path discovery system 16 may perform the emulation stage in a number of ways, and is described below using the non-limiting example of injecting test calls, for ease of discussion. As used herein, the injection of test calls may encompass various techniques, and is not necessarily limited to the generation of calls (whether robocalls or otherwise) to the TFNs hosted by ingress nodes 4. As used herein, a "test call" refers to a test data that path discovery system 16 may provide or cause another system to provide, via a TFN hosted by one of ingress nodes 4, to simulate any of incoming calls 6 or incoming calls with other (e.g., hypothetical) sets of call conditions.

During the emulation stage of the traversal phase, path discovery system 16 injects calls into telephony network 2 and uses any of the outputs of the ingestion phase and logic parsing phase (or various combinations thereof) to route the injected calls to one of endpoint nodes 12. For instance, path discovery system 16 may apply the routing script metadata (and where applicable, the end variable states obtained from previously recorded post call logs) to emulate the traversal of these injected "test" calls through telephony network 2. In some instances, path discovery system 16 may also fill in any gaps in the emulated traversal paths by applying relevant in-node decision logic available from the control flow graph constructed in the logic parsing phase.

Path discovery system 16 may configure the injected test calls differently, e.g., to have different sets of entry conditions. In instances in which the routing script metadata does not provide node-to-node hop information (e.g., because of an individual decision being offloaded to external agent 14, or for other reasons), path discovery system 16 may use past call heuristics to identify one or more past calls that have at least some level of commonality in terms of entry conditions to the injected test call. In turn, path discovery system 16 may apply the end variable states of the past call(s) that at least partially match the entry condition profile of the injected test call to extrapolate the next hop for any of intermediate nodes 8 for which the routing script metadata does not provide next hop information.

If path discovery system 16 determines that the next hop information for any of intermediate nodes 8 is unavailable from the combination of the routing script metadata and the end variable states extracted from post call logs with similar entry condition profiles (i.e., the next hop information is unavailable from any of the ingestion phase data), then path discovery system 16 may map a particular portion of the control flow graph constructed in the logic parsing phase to the intermediate node 8 for which the next hop is undetermined, and may execute the logic attributed to that particular intermediate node 8.

That is, path discovery system 16 may execute the in-node logic at the particular intermediate node 8 for which the next hop is unknown, and explore all possible paths yielded by different outcomes of the in-node logic extracted from the control flow graph. In the example of a Boolean conditional decision, path discovery system 16 may explore both the "true" path and the "false" path that are possible egress routes from the intermediate node 8 at which the emulation stage is presently executing. As used herein, an "egress route" refers to a next-hop to which any of ingress nodes 4 or intermediate nodes 8 can forward a call. The tree-based structure of telephony network 2 allows for multiple possible egress routes from a particular ingress node 4 or intermediate node 8, depending on the outcome of the in-node decision logic as applied to a particular call with corresponding call conditions.

Scenarios in which path discovery system 16 emulates multiple egress routes to produce traversal path divergence or path diversity in the emulations. Because both "true" and "false" paths represent viable paths based on possible control flow logic outcomes, path discovery system 16 emulates both outcomes during the emulation stage. According to some aspects of this disclosure, path discovery system 16 may prune the number of traversed paths if path discovery system 16 determines that divergent paths re-converge for a particular injected test call, without appreciably affecting the overall end variable state profile. That is, if divergent traversal paths re-converge for a single injected test call, path discovery system 16 may determine that the two paths are trivially variant, and may eliminate all except one of the trivially variant paths for the emulation records. As such, the term "trivially divergent," as used herein, refers to traversal paths that diverge at the egress from one of ingress nodes 4 or intermediate nodes 8, but re-converge before reaching a common destination represented by a single endpoint node 12.

To determine whether divergent paths are trivially divergent or truly divergent, path discovery system 16 may consult an internal map that holds variable states at entry to each of intermediate nodes 8 when that particular intermediate node 8 represents the next hop node along an emulated traversal path. Path discovery system 16 is configured to check a global hash set to determine whether or not the state of a path entering each intermediate node 8 is unique. More specifically, path discovery system 16 checks the state of the call at the intermediate node 8 that the path is about to enter, along with the variable map as formed up until that point.

Path discovery system 16 logs the first path to enter a particular intermediate node 8 with the variable map up until that point. If path discovery system 16 determines that another state of the path traverses to that particular intermediate node 8, path discovery system 16 checks the hash set to determine whether any other state has entered the intermediate node 8 with the same variable map up until that point. If the determination is "true," then path discovery system 16 may terminate the redundant (later-occurring) path exploration. If the determination is "false," then path discovery system 16 may continue with the later-occurring path exploration.

As part of the emulation stage of the traversal phase, path discovery system 16 may also emulate various runtime decisions to which call routing processes may be subject. Examples of runtime decision scenarios include overall health checks with respect to telephony network 2, may perform date and/or time checks across telephony network 2, may test server failover resilience over telephony network 2, etc. In the case of runtime decisions, path discovery system 16 may implement an "explore all paths" methodology. That is, path discovery system 16 may explore all possible paths, no matter the magnitude of the divergences therebetween, in the case of runtime decisions. For instance, all possible paths represent legitimate runtime possibilities, based on rerouting calls from a non-working server to a backup server, etc.

Upon completing the emulation stage of the traversal phase, path discovery system 16 performs the tracing stage of the traversal phase. As part of the tracing stage, path discovery system 16 records the paths actually traversed by each injected test call, the entry conditions of the respective test call, and the combined logic formed from the routing script metadata, the post call log end variable states, and the modules run from the control flow graph. By mapping the entry conditions of an injected test call to the actual path traversed to the respective endpoint node 12 during the emulation stage, path discovery system 16 implements the tracing stage to form a repository of traversal paths over telephony network 2 for various sets of entry conditions.

After completing the traversal phase, path discovery system 16 performs a routing path discovery stage referred to herein as a "report generation" or "documentation" phase. As part of the report generation phase, path discovery system 16 generates one or more reports in machine-readable format. Path discovery system 16 may generate one or both of a granular path report and/or a path analysis report, using the data repository formed during the tracing stage of the traversal phase. Path discovery system 16 may form a granular path report to include, for each emulated traversal path, the routing logic implemented at each of intermediate nodes 8, the decision reached at each of intermediate nodes 8 based on the in-node routing logic, etc. In some examples, path discovery system 16 generates the granular path report to highlight certain "points of interest" (e.g., so-called "pivot" points) along the traversal path of a call, while still exposing every node and every decision of a path granularly. In this way, path discovery system 16 generates each granular path report to expose the overall routing behavior of telephony network 2 from entry at a respective ingress node 4 to termination at a respective endpoint node 12. The granular path report may include fields including the TFN called, the VDN reached, a vector value, an "indexinpath" value, a "masterscript" identifier, a "nextnodes" identifier, true/false values for various call routing attributes or decisions, and numerous other fields.

Path discovery system 16 generates the path analysis reports to reflect a high-level examination of the routing decisions implemented at intermediate nodes 8 and important variable end states gathered from the intermediate nodes 8 that were in the emulated traversal path. The path analysis report, as such, may be viewed as an abstraction of highlights and/or valuable data chosen from the granular path report for the same traversal. To generate the path analysis report for a given traversal, path discovery system 16 may use information gathered from current state extraction to identify which endpoint node 12 any of incoming calls 6 will terminate at, and which combination of configurations of ingress nodes 4 and intermediate nodes 8 affected the routing of an injected test call with similar entry conditions to the particular endpoint node 12. More specifically, path discovery system 16 may utilize information gathered using an iterative automated process, by re-running and updating on a regular scheduled basis. In this way, path discovery system 16 may generate the path analysis report for a traversal while keeping all of the extracted information true to the live system implemented over telephony network 2.

Again, path discovery system 16 generates the path analysis report and the granular report for each emulated traversal path in a machine-readable format. By generating these reports describing individual traversal paths in machine-readable format, path discovery system 16 enables other systems to utilize the path discovery results of this disclosure as a backbone for various automated processes. For example, systems that automate platform migrations of telephony network 2 to a new underlying platform may use the path analysis reports and/or the granular path reports as inputs to configure the routing logic backbone of the post-migration telephony system. By porting the routing logic to the post-migration telephony system, the migration system reduces the resource expenditure that would otherwise be necessary to reestablish the routing logic configuration (e.g., via routing script generation, etc.) after migration.

As another example, network integration systems configured to merge telephony network 2 with other existing telephony network(s) may use the path analysis reports and/or the granular path reports as inputs to configure the routing logic backbone of the portion of the merged telephony network represented by telephony network 2. By incorporating the overall routing logic of telephony network 2 into the merged telephony network, the network integration systems reduce the resource expenditure that would otherwise be necessary to redo the routing logic configuration (e.g., via routing script generation, etc.) of discrete portions of the merged telephony network after the merger.

In some examples, each of ingress nodes 4 hosts a TFN, and each of endpoint nodes 12 hosts a vector-dialed number (VDN). The VDN hosted by a respective endpoint node 12 represents a destination of an incoming call 6 entering via a TFN hosted by one of ingress nodes 4. The path analysis and granular path reports generated by path discovery system 16 provide different levels of detail on the TFN entry to VDN destination traversal of a call, and also variables used by ingress nodes 4 and intermediate nodes 8 in the pipelined decision process used to route the call to the pertinent VDN. Examples of these variables include a call type variable, a routing indicator, several peripheral variables, nonce parameter variables, user variables, or numerous others. These variables may represent aspects of the entry conditions of any of incoming calls 6.

The variables reflected in the path analysis report and/or the granular path report illustrate ways in which calls traverse telephony network 2 differently, even if multiple calls ingress via the same TFN. For instance, calls with different entry conditions (e.g., caller needs/inquiry types/ caller types, etc.) might ingress at the same TFN. For example, calls with a "customer" caller type, an "administrator" caller type, a "third party provider" type, and/or other caller types may ingress at the same TFN. As another example, calls with a "claims" inquiry type, "online login password reset" inquiry type, and/or other inquiry types may ingress at the same TFN.

Each VDN may map to one or multiple agents whose skill sets match the entry condition set of a particular incoming call 6. Conversely, a single agent may have a skill set that qualifies to be mapped to multiple VDNs. Endpoint nodes 12 may implement the VDNs such that the VDNs load balance calls across agents or agent groups, to keep certain agents with rarely found skills open for other VDNs, etc. As such, the VDNs process attributes including, but not limited to, the entry conditions of the call, skill set matching to best suit the entry conditions, and various others. Path discovery system 16 may generate the path analysis and granular path reports to preserve different condition combinations that route a call to a particular VDN. For example, a call with the condition 3-tuple of a "customer" caller type, an "English" language preference, and a "claims" inquiry type may route to a different VDN than a call with the condition 3-tuple of a "third party provider" caller type, a "Spanish" language preference, and an "online login password reset" inquiry type, even if both calls enter via the same TFN hosted by one of ingress nodes 4.

Figure 2A:
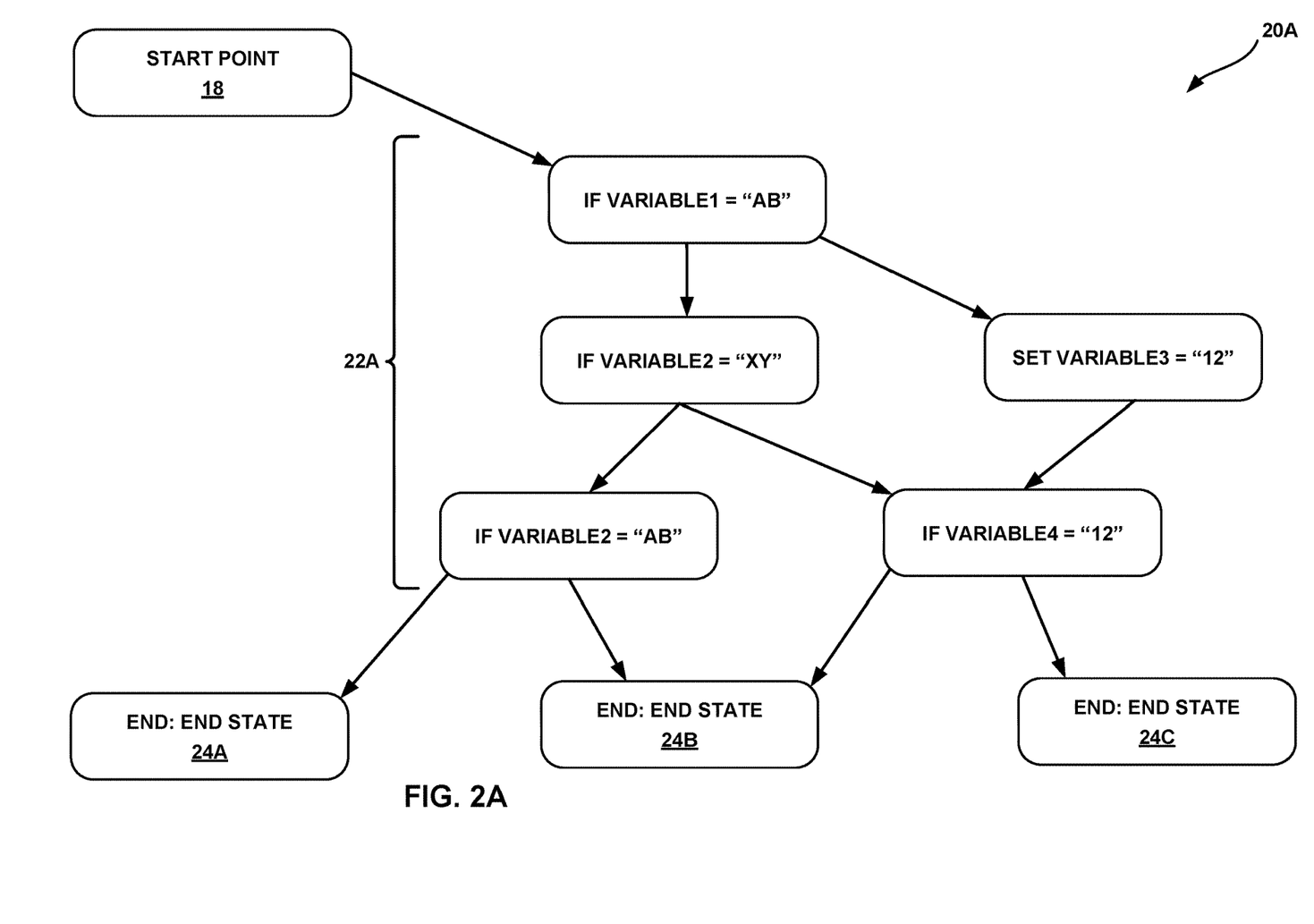
FIGS. 2A & 2B are flowcharts illustrating examples of control flows that the path discovery system of FIG. 1 may process with respect to call routing from entry via one or more ingress nodes through termination at an endpoint node within the telephony network of FIG. 1.
Figure 2B:
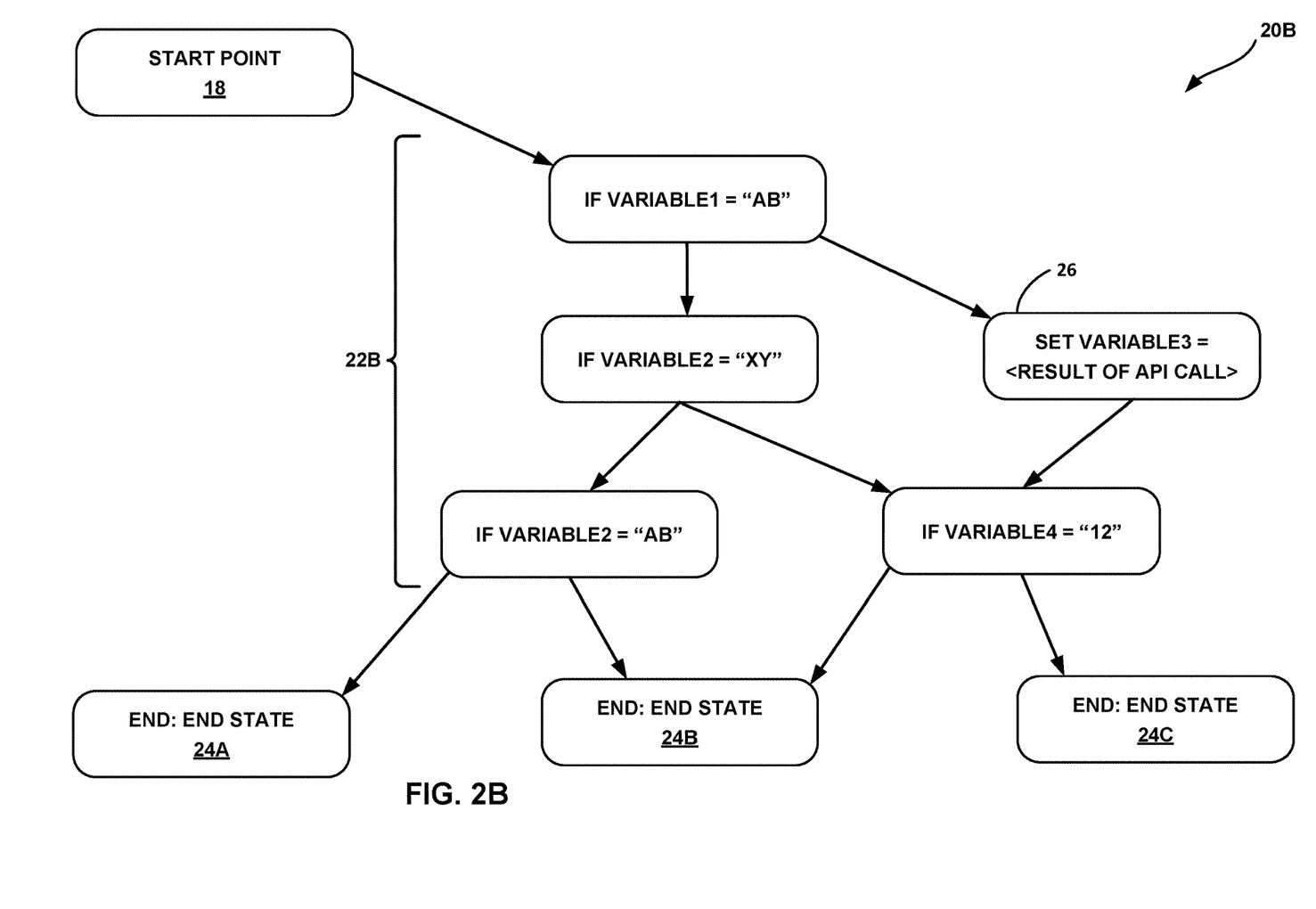

FIGS. 2A & 2B are flowcharts illustrating examples of control flows that path discovery system 16 may process with respect to call routing from entry via ingress nodes 4 through termination at endpoint nodes 12 within telephony network 2. Control flow graph 20A of FIG. 2A illustrates a call traversal path for which path discovery system 16 extracts in-node routing logic for ingress nodes 4 and intermediate nodes 8 without extrapolating logic that is offloaded to external agent 14. Control flow graph 20A includes start point 18, routing decision tree 22A, and end states 24A-24C (collectively, "end states 24"). Start point 18 represents intake logic implemented at ingress nodes 4, such as IN-WATS based TFN intake, etc.

Routing decision tree 22A represents a simplified version of decision-based switching that ingress nodes 4 and intermediate nodes 8 perform, to route one or more of incoming calls 6 to a VDN executing on one of endpoint nodes 12. The decision-based switching pipelines implemented through routing decision tree 22A deterministically route each of incoming calls 6 to a respective end state 24A, based on a respective series of call condition determinations. In the case of control flow graph 20A, ingress nodes 4 and intermediate nodes 8 execute the decision logic locally. Thus, path discovery system 16 may extract the routing logic represented by control flow graph 20A without reverse-engineering any externally implemented logic using end variable states.

A Javascript code expression from which path discovery system 16 may extract routing decision tree 22A is presented below:

```
If(variable1 == "ab"){
    Variable3 = "12";
    If(variable4 == "12"){
        Console.log("End State 3");
    } else {
        Console.log("End State 2");
    }
} else if (variable2 == "xy") {
    If(variable4 == "12"){
        Console.log("End State 3")
    } else {
        Console.log(End State 2");
    }
} else if(variable2 == "ab") {
    Console.log("End State 2");
} else {
    Console.log("End State 1");
}
```

Control flow graph 20B of FIG. 2B illustrates a call traversal path for which path discovery system 16 extracts in-node routing logic for ingress nodes 4 and intermediate nodes 8 by extrapolating logic that is offloaded to external agent 14. Similarly numbered elements of control flow graph 20A and 20B are not described separately with respect to control flow graph 20B, for the sake of brevity. Routing decision tree 22B represents a simplified version of decision-based switching that ingress nodes 4 and intermediate nodes 8 perform, to route one or more of incoming calls 6 to a VDN executing on one of endpoint nodes 12, using external agent 14 to implement some portions of the decision series.

Routing decision tree 22B of control flow graph 20B includes application programming interface (API) call 26. While API call 26 may take one of several forms, API call 26 is described herein by way of the example of a web-based call. That is, one of ingress nodes 4 or intermediate nodes 8 may perform API call 26 to cause an underlying subroutine to execute as a process at a remote address space (e.g., over a private network, at external agent 14).

Path discovery system 16 implements techniques of this disclosure to reconstruct the decision logic implemented at the particular node performing API call 26, which would otherwise remain opaque. Path discovery system 16 uses the end variable state of the node that performed API call 26 (obtained from post call logs) as an input to the path discovery process of this disclosure, and uses the end variable state of the calling node to reconstruct the routing logic effectively implemented at the calling node by way of performing API call 26.

Figure 3:
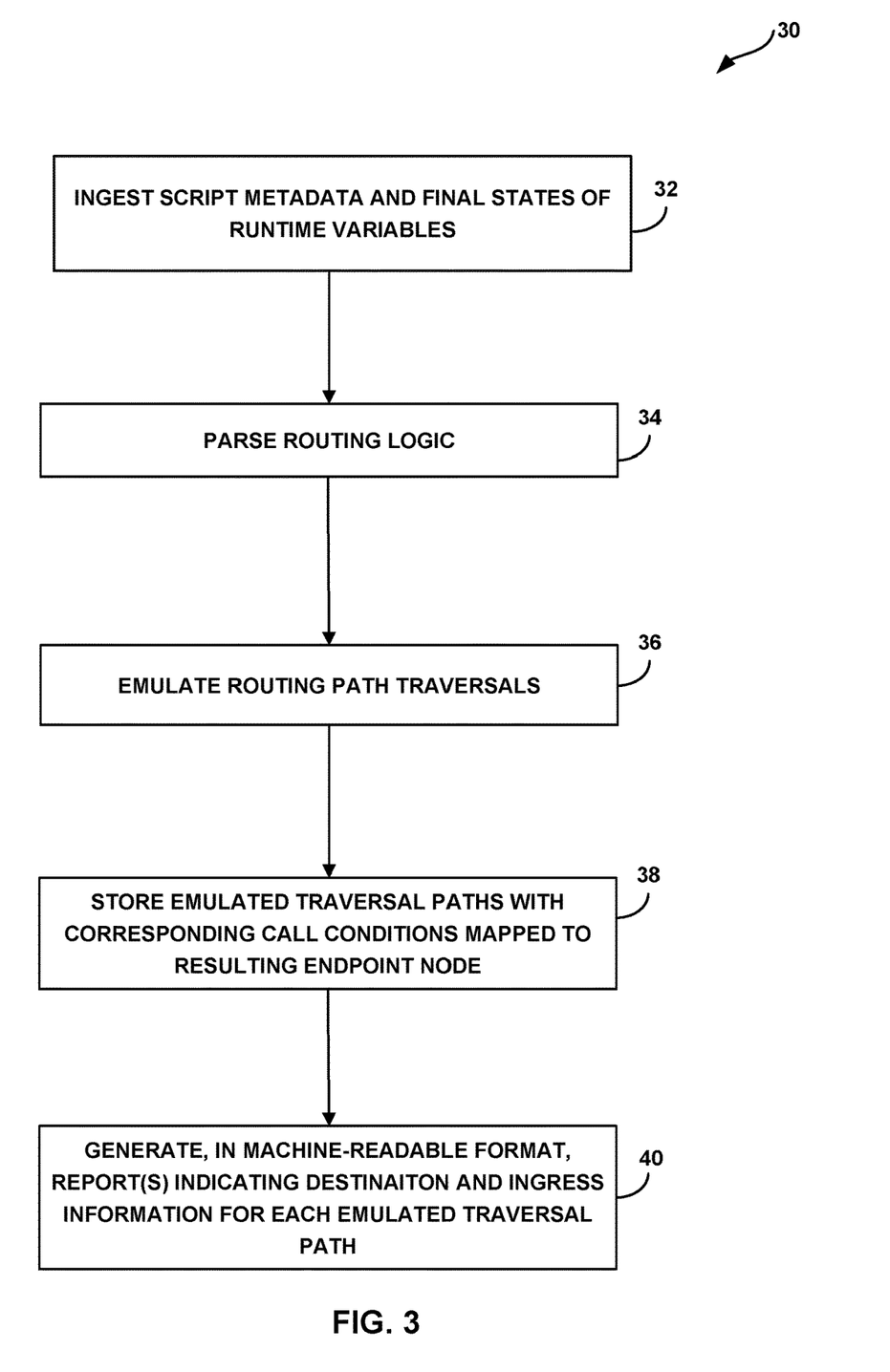
FIG. 3 is a flowchart illustrating an example of a routing path discovery process that the path discovery system of FIG. 1 may perform, in accordance with aspects of this disclosure.

FIG. 3 is a flowchart illustrating routing path discovery process 30 that path discovery system 16 may perform, in accordance with aspects of this disclosure. Routing path discovery process 32 may begin with path discovery system 16 ingesting routing script metadata and final states of runtime variables of ingress nodes 4 and intermediate nodes 8 (32). Step 32 is described above with respect to FIG. 1 as the "ingestion phase" during which path discovery system 16 obtains routing script metadata from one or more control flow sources associated with telephony network 2 and the end states of runtime variables from post call logs associated with telephony network 2.

Next, path discovery system 16 may parse the routing logic implemented over telephony network 2 (34). Step 34 is described above with respect to FIG. 1 as the "logic parsing phase," as part of which path discovery system 16 extrapolates the in-node routing logic implemented at each of ingress nodes 4 and intermediate nodes 8 (e.g., via API calls to external agent 14 or to another remote address), as described above.

In turn, path discovery system 16 may emulate the traversals of various routing paths from ingress nodes 4 to endpoint nodes 12 (36). Step 36 is described above with respect to FIG. 1 as the "traversal phase" of routing path discovery process 30. Again, path discovery system 16 may model the routing path traversals across telephony network 2 as a series of multiple computational stages, including an emulation stage and a tracing stage. Path discovery system 16 may perform the traversal phase of routing path discovery process 30 in several ways, such as, but not limited to, injecting test calls, as described above. As part of the traversal phase of routing path discovery process 30, path discovery system 16 may prune the list of modeled traversal paths based on detecting trivial divergences, such as trivially divergent traversal paths that re-converge for a particular injected test call, without appreciably affecting the overall end variable state profile.

Path discovery system 16 may store the emulated traversal paths with the corresponding call conditions mapped to the respective resulting endpoint node 12 (38). For example, path discovery system 16 may use the mappings to correlate entry condition profiles (which reflect a grouping of call conditions) with emulated traversal paths, and may thereby generate output data that can be used as an input to network backbone migration systems, network upgrade systems, network onboarding systems, and other automated systems configured to implement changes with respect to telephony network 2.

Path discovery system 16 may generate, in machine-readable format, one or more reports indicating destination and ingress information of each emulated traversal path (40). Step 40 is described above with respect to FIG. 1 as the "report generation" or "documentation phase" of routing path discovery process 30.

Figure 4A:
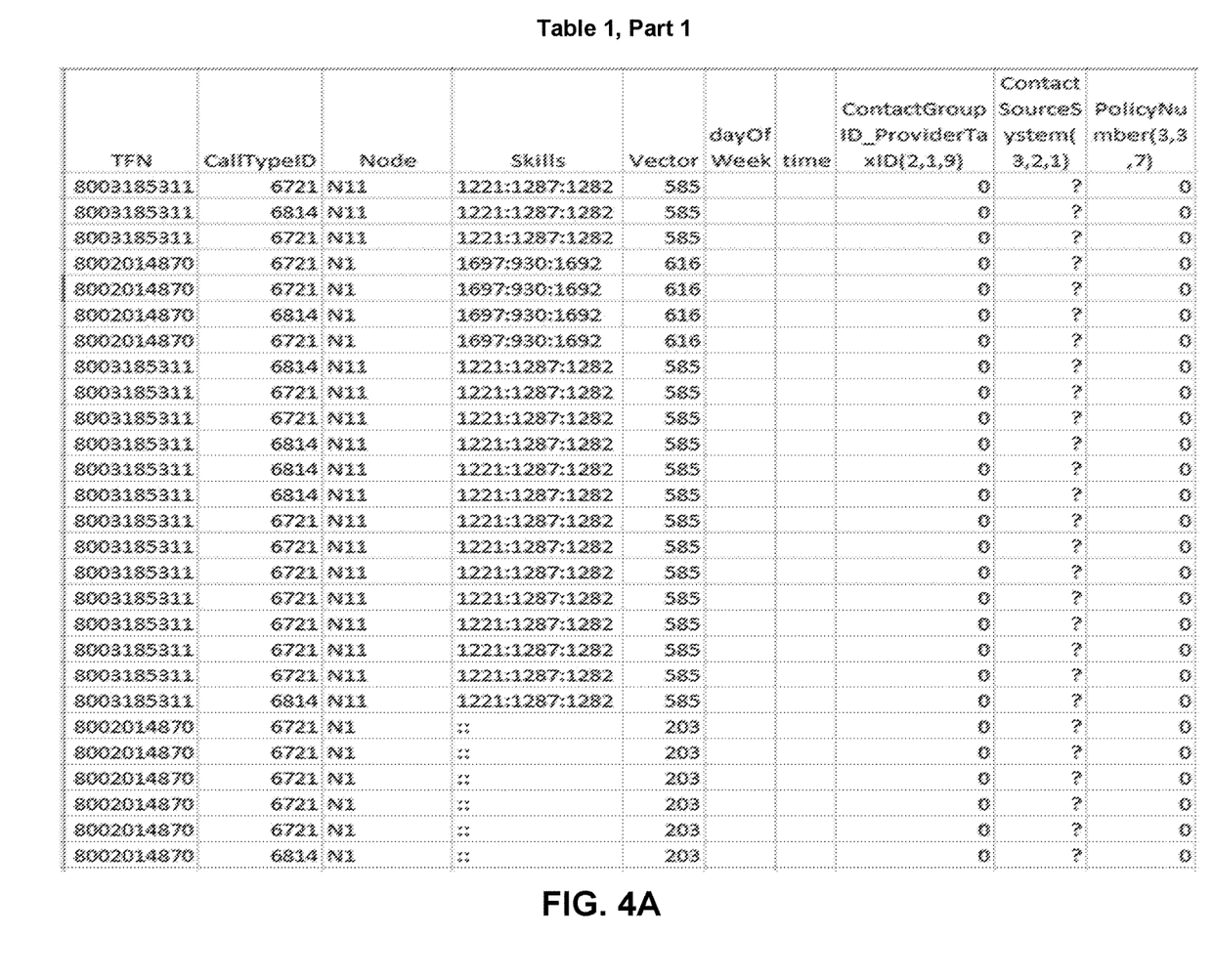

FIGS. 4A & 4B illustrate an excerpt of an uncollapsed or expanded version of a path analysis report generated by path discovery system 16. The uncollapsed path analysis report is presented in tabular form in FIGS. 4A & 4B, in two parts for purposes of legibility.

Table 1 of FIGS. 4A & 4B includes the TFNs representing the respective ingress points to telephony network 2 and the destination to which each of the injected calls routes (in the form of the VDN identified by the decision tree). Other columns of Table 1 represent other information and variable values that ingress nodes 4 and intermediate nodes 8 implemented to route calls to the destinations (in the form of the VDNs implemented by endpoint nodes 12). Table 1 reflects this information for each path and unique set of values that path discovery system 16 found with respect to routing each call from a TFN to a VDN.

Figure 5:
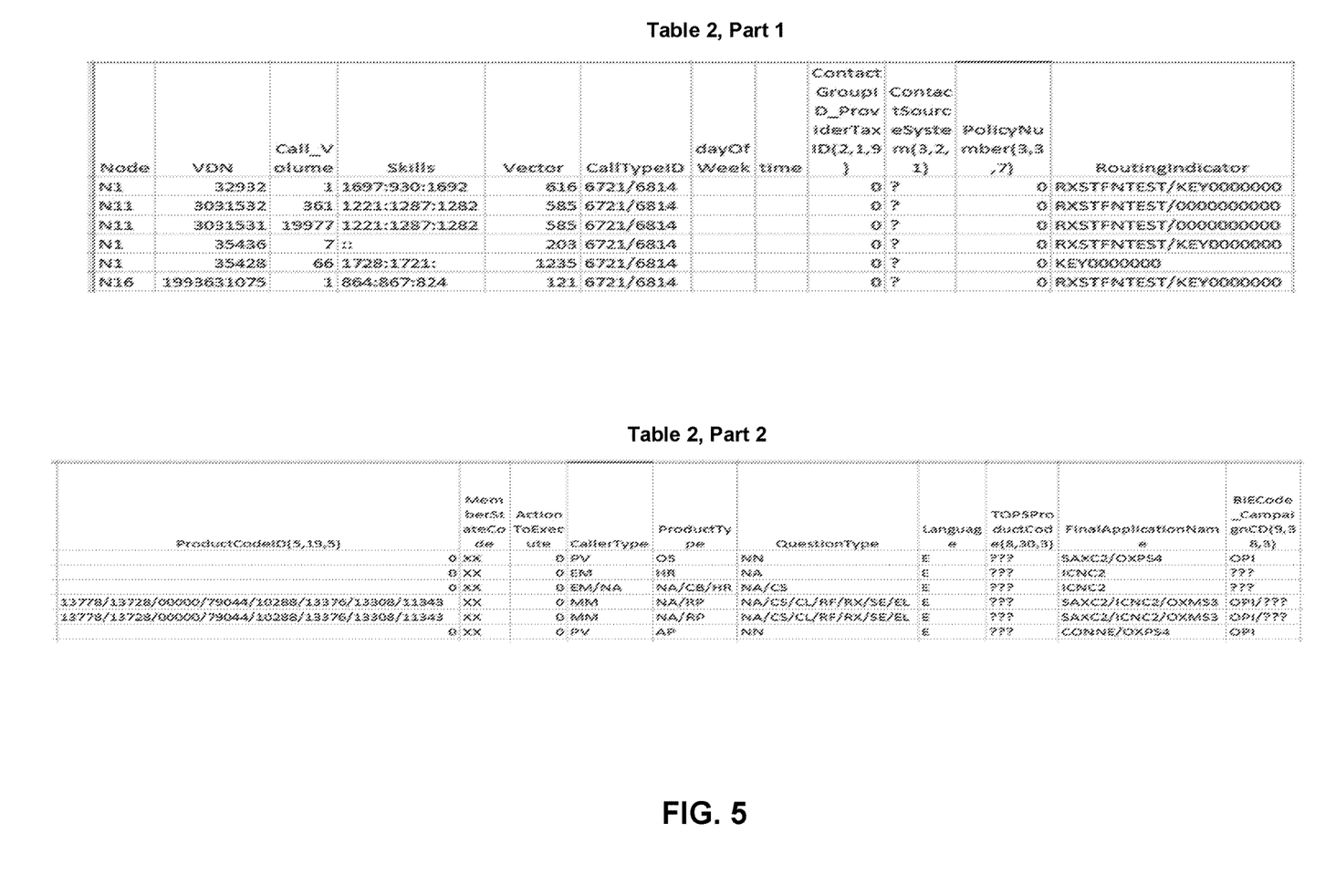
FIG. 5 illustrates a collapsed version of an excerpt of the table illustrated in FIGS. 4A & 4B.

FIG. 5 illustrates a collapsed version of an excerpt of Table 1. In Table 2 shown in FIG. 5, all of the values for each variable grouping are combined by the TFN-VDN to "summarize" the data. Table 2 is presented in FIG. 5 in two parts for legibility.

In various examples, path discovery system 16 may generate a granular path report in addition to the path analysis report or instead of the path analysis report for a traversal path discovered over telephony network 2. Path discovery system 16 may generate the granular path report such that, when parsed in tabular form, each row corresponds to a single node that formed a hop during an emulated traversal path. That is, each of ingress nodes 4 and intermediate nodes 8 represented in the control flow graph (or "routing graph") for an emulated traversal path is described by a respective row of the granular path report generated by path discovery system 16. Each row describes the decision logic extracted by path discovery system 16 for the corresponding node. Again, expressed in tabular form, each granular path report describes, for a single corresponding emulated traversal path, a sequential hop sequence ordered by the node encountered. Each granular path report describes the logic extracted or modeled by path discovery system 16 for each node, and in the end, showing the destination VDN implemented by a respective endpoint node 12 and all of the final variable states for ingress nodes 4 and intermediate nodes 8.

For example, a granular path report corresponding to control flow graph 20A may enumerate, for any individual node of routing decision tree 22A, deterministic logic (e.g., a check whether a substring of a variable corresponds to a particular value, such as "AB," "XY," etc.) or an action performed based on the outcome of the deterministic logic (e.g., to set a variable to a particular value, such as "12" or others). Again control flow graphs 20A and 20B represent simplified examples, and in practice, path discovery system 16 may process much larger control flow graphs, such as some with over 700,000 nodes to check and parse call conditions, implement decision logic, set variable values, set logic for runtime decisions, etc. Moreover, path discovery system 16 may also emulate traversal paths for a potentially large number of different routing scripts, such as 5,000 scripts or greater in some scenarios. As such, path discovery system 16 generates path analysis reports and/or granular path reports in a scalable manner, to facilitate complex network migrations and/or complex network integrations.

Again, while path discovery system 16 may generate the path analysis report and the granular path report to include some overlapping data, each path analysis report represents a synopsis or "highlights" of the corresponding granular path report. Path discovery system 16 may generate the path analysis reports and granular path reports in an automated intermediate persistent (AIP) format, which is an example of a machine-readable format, or in another machine-readable format. A path analysis report or a granular path report may represent an input that can be fed into a script generation automation system executing on a migration platform or an integration platform.

Figure 6:
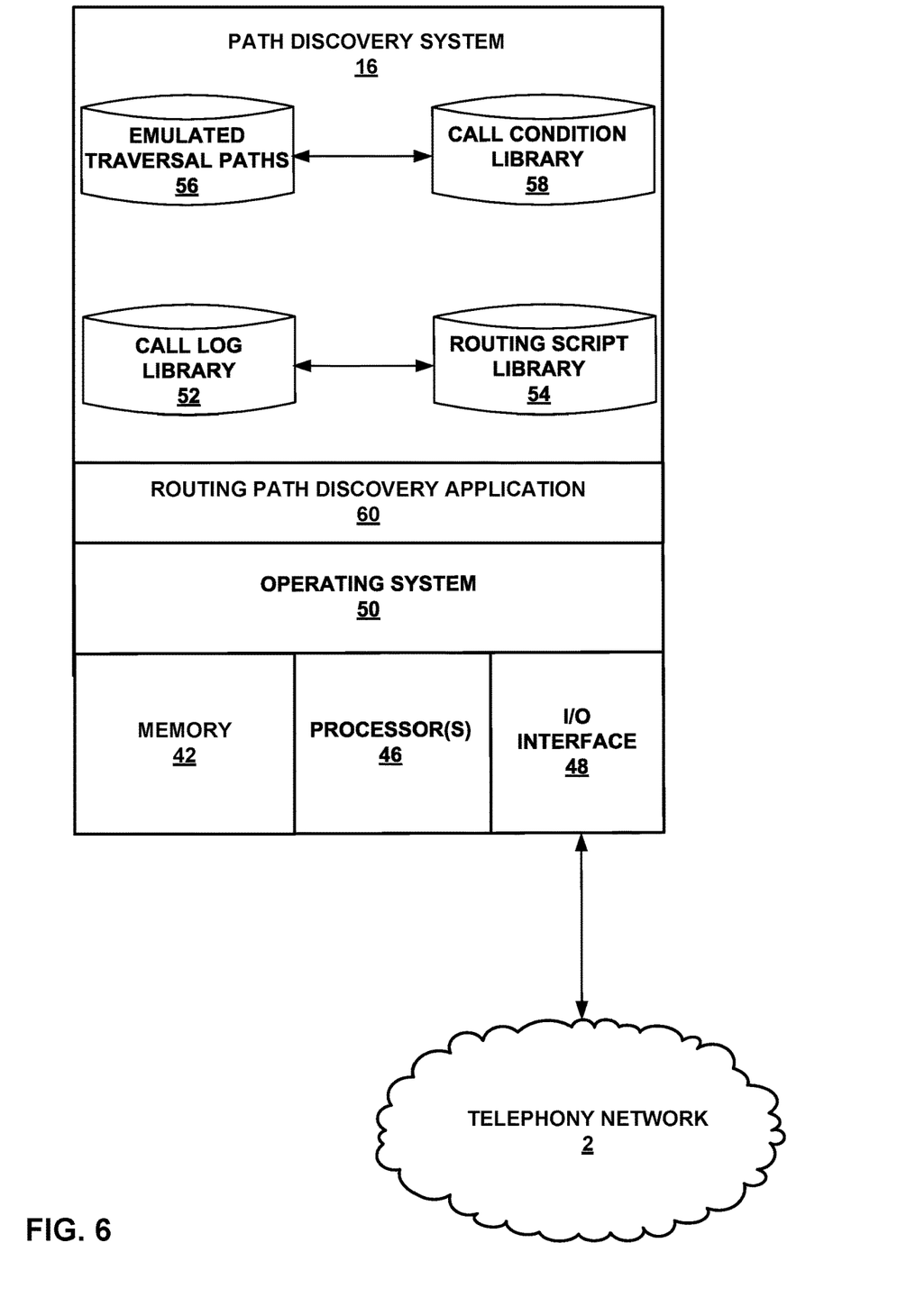
FIG. 6 is a block diagram illustrating an example implementation of the path discovery system of FIG. 1.

FIG. 6 is a block diagram illustrating an example implementation of path discovery system 16 of FIG. 1. In the example shown in FIG. 6, path discovery system 16 includes memory 42 and one or more processors 46 communicatively connected to memory 42. In some examples, memory 42 and processor(s) 46 may be integrated into a single hardware unit, such as a system on a chip (SoC). Each of processor(s) 46 may include, be, or be part of one or more of a multi-core processor, a controller, a digital signal processor (DSP), an application specific integrated circuit (ASIC), a field-programmable gate array (FPGA), processing circuitry (e.g., fixed-function circuitry, programmable circuitry, or any combination of fixed function circuitry and programmable circuitry) or equivalent discrete logic circuitry or integrated logic circuitry. Memory 42 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Memory 42 and processor(s) 46 provide a computer platform for executing operation system 50. In turn, operating system 50 provides a multitasking operating environment for executing software components, such as routing path discovery application 60 and/or other software components. As shown, processors 46 connect via an I/O interface 48 to external systems and devices, such as to one or more devices of or connected to telephony network 2. Moreover, I/O interface 48 may incorporate network interface hardware, such as one or more wired and/or wireless network interface controllers (NICs) for communicating via communication channel 16, which may represent a packet-based network. Software components executing on path discovery system 16, such as routing path discovery application 60, represent executable software instructions that may take the form of one or more software applications, software packages, software libraries, hardware drivers, and/or Application Program Interfaces (APIs).

Routing path discovery application 60 implements functionalities that enable path discovery system 16 to perform path discovery techniques of this disclosure over telephony network 2, such as by performing routing path discovery process 30 of FIG. 3, or in other ways described in this disclosure. Routing path discovery application 60 may include, for example, one or more software packages, software libraries, hardware drivers, and/or Application Program Interfaces (APIs) for implementing routing path discovery process 30 or other permutations and combinations of functionalities described herein.

Routing path discovery application 60 may access and/or update various data repositories, whether implemented locally at path discovery system 16 or at remote devices to which path discovery system 16 is directly or indirectly coupled via I/O interface 48. In the example of FIG. 6, path discovery system 16 implements four data repositories, namely, call log library 52, routing script library 54, emulated traversal paths 56, and call condition library 58.

Upon being invoked to implement path discovery over telephony network, routing path discovery application 60 may obtain routing script metadata from routing script library 54, and apply the routing script metadata to data representing telephony network 2 as part of the ingestion phase of the routing path discovery techniques of this disclosure. Also, as part of the ingestion phase of the routing path discovery processes of this disclosure, routing path discovery application 60 obtains the end states of runtime variables of ingress nodes 4 and intermediate nodes 8 from call log library 52. By applying the appropriate routing script metadata obtained routing script library 54 and populating the final states of decision variables of ingress nodes 4 and intermediate nodes 8 as obtained from call log library 52, routing path discovery application 60 may complete the ingestion phase of the routing path discovery processes of this disclosure.

In the example implementation shown in FIG. 6, path discovery system 16 also includes data repositories for emulated traversal paths 56 and call condition library 58. Routing path discovery application 60 may store, to emulated traversal paths 56, the traversal paths that were discovered over telephony network 2 with respect to the injected test calls. Additionally, routing path discovery application 60 may store the call conditions of the injected test calls to call condition library 58. Routing path discovery application 60 may map each of emulated traversal paths 56 to corresponding entries or groups of entries in call condition library 58. In some non-limiting examples, routing path discovery application 60 may map the destination VDN of each of emulated traversal paths 56 to one or more entries in call condition library.

Routing path discovery application 60 may use the mappings between emulated traversal paths 56 and call condition library to correlate entry condition profiles (which reflect a grouping of call conditions) with traversal paths or certain features of the traversal paths (e.g., the VDN reached at the end thereof). Routing path discovery application 60 may thereby generate output data (e.g., path analysis reports and/or granular path reports) in machine-readable (e.g., AIP) format that can be used as an input to network backbone migration systems, network upgrade systems, network onboarding systems, and other automated systems configured to implement changes with respect to telephony network 2. As used herein, a "backbone migration system" refers to an automated system that transfers the routing logic of a telephony network to a different computing platform. As used herein, a "network upgrade system" refers to an automated system that implements changes (e.g., patches, etc.) to the routing logic of a telephony network as implemented on a legacy platform. As used herein, a "network onboarding system" refers to an automated system that merges and integrates one telephony network with another existing telephony network. The machine-readable reports generated by path analysis system 16 enable these automated systems to interpret the routing logic of telephony network 2 for any of the above-listed automated programmatic changes.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), processing circuitry (e.g., fixed function circuitry, programmable circuitry, or any combination of fixed function circuitry and programmable circuitry), or any other equivalent integrated logic circuitry or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), processing circuitry (e.g., fixed function circuitry, programmable circuitry, or any combination of fixed function circuitry and programmable circuitry), or other equivalent integrated logic circuitry or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wired or wireless communication device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

Various examples have been described. These and other examples are within the scope of the following claims.

What is claimed is:

1. A path discovery system comprising:
a memory; and
processing circuitry in communication with the memory, the processing circuitry being configured to:
obtain routing script metadata associated with a telephony network;
parse routing logic implemented by one or more nodes of the telephony network;
emulate, using the routing script metadata and the parsed routing logic, a traversal path for a call through the telephony network, the emulated traversal path including the one or more nodes for which the routing logic is parsed, wherein to emulate the traversal path for the call, the processing circuitry is configured to explore multiple egress routes from a particular node of the one or more nodes included in the emulated traversal path based on a determination that next hop information for the particular node is unavailable from the routing logic parsed for the particular node;
store, to the memory, the emulated traversal path; and
generate, in a machine-readable format, one or more reports indicating a destination of the emulated traversal path in the telephony network and an ingress of the emulated traversal path with respect to the telephony network.

2. The path discovery system of claim 1, wherein the processing circuitry is further configured to obtain, from one or more post call logs, end variable states associated with each of the one or more nodes included in the emulated traversal path, and wherein to emulate the traversal path for the call through the telephony network, the processing circuitry is configured to further use the end variable states obtained from the one or more post call logs and associated with each of the one or more nodes included in the emulated traversal path.

3. The path discovery system of claim 2, wherein the particular node is a first particular node, and the processing circuitry is configured to:
determine that a second particular node of the one or more nodes included in the emulated traversal path is configured to perform an application programming interface (API) call to implement in-node routing logic; and
apply a respective end variable state of the end variable states obtained from the one or more post call logs corresponding to the second particular node to parse the in-node routing logic of the particular node.

4. The path discovery system of claim 1, wherein the emulated traversal path is included in a group of divergent traversal paths, based on the multiple egress routes explored from the particular node.

5. The path discovery system of claim 4, wherein the processing circuitry is further configured to:
determine that at least two divergent traversal paths of the divergent traversal paths represent trivially divergent traversal paths; and
store only one of the trivially divergent traversal paths to the memory.

6. The path discovery system of claim 5, wherein to determine that the at least two divergent traversal paths represent trivially divergent traversal paths, the processing circuitry is configured to detect a divergence and a re-convergence of the at least two divergent traversal paths.

7. The path discovery system of claim 1, wherein to generate the one or more reports indicating the destination of the emulated traversal path in the telephony network and the ingress of the emulated traversal path with respect to the telephony network, the processing circuitry is configured to indicate, in the one or more reports a toll-free number (TFN) implemented by an ingress node of the telephony network and a vector-dialed number (VDN) hosted by an endpoint node of the telephony network, and wherein the call enters the telephony network via the TFN and terminates at the VDN.

8. The path discovery system of claim 1, further comprising an input/output (I/O) interface, wherein the machine-readable format comprises an automated intermediate persistent (AIP) format, and wherein the processing circuitry is further configured to send, via the I/O interface, the one or more reports to one or more of a migration system, a network upgrade system, or a network onboarding system.

9. The path discovery system of claim 1, wherein the processing circuitry is further configured to implement, in the memory, a mapping between the emulated traversal path and one or more call conditions associated with the call.

10. The path discovery system of claim 9, wherein the one or more call conditions include at least one of a caller type, an inquiry type, or a language preference.

11. The path discovery system of claim 1, further comprising an input/output (I/O) interface, wherein the call is a test call, and wherein the processing circuitry is configured to inject, via the I/O interface, the test call into the telephony network.

12. The path discovery system of claim 1, wherein the processing circuitry is further configured to store, to the memory, respective final states of runtime variables associated with the one or more nodes included in the emulated traversal path.

13. A non-transitory computer-readable storage medium encoded with instructions that, when executed, cause processing circuitry of a path discovery system to:
obtain routing script metadata associated with a telephony network;
parse routing logic implemented by one or more nodes of the telephony network;
emulate, using the routing script metadata and the parsed routing logic, a traversal path for a call through the telephony network, the emulated traversal path including the one or more nodes for which the routing logic is parsed, wherein instructions that cause the processing circuitry to emulate the traversal path for the call comprise instructions that, when executed, cause the processing circuitry to explore multiple egress routes from a particular node of the one or more nodes included in the emulated traversal path based on a determination that next hop information for the particular node is unavailable from the routing logic parsed for the particular node;

store, to a memory, the emulated traversal path; and generate, in a machine-readable format, one or more reports indicating a destination of the emulated traversal path in the telephony network and an ingress of the emulated traversal path with respect to the telephony network.

14. A method comprising:

obtaining, by a path discovery system, routing script metadata associated with a telephony network;

parsing, by the path discovery system, routing logic implemented by one or more nodes of the telephony network;

emulating, by the path discovery system, using the routing script metadata and the parsed routing logic, a traversal path for a call through the telephony network, the emulated traversal path including the one or more nodes for which the routing logic is parsed, wherein emulating the traversal path for the call comprises exploring multiple egress routes from a particular node of the one or more nodes included in the emulated traversal path based on a determination that next hop information for the particular node is unavailable from the routing logic parsed for the particular node;

storing, by the path discovery system, the emulated traversal path; and generating, by the path discovery system, in a machine-readable format, one or more reports indicating a destination of the emulated traversal path in the telephony network and an ingress of the emulated traversal path with respect to the telephony network.

15. The method of claim 14, wherein the emulated traversal path is included in a group of divergent traversal paths, based on the multiple egress routes explored from the particular node.

16. The method of claim 15, further comprising:

determining, by the path discovery system, that at least two divergent traversal paths of the divergent traversal paths represent trivially divergent traversal paths; and store only one of the trivially divergent traversal paths to a memory.

17. The method of claim 16, wherein determining that the at least two divergent traversal paths represent trivially divergent traversal paths comprises detecting, by the path discovery system, a divergence and a re-convergence of the at least two divergent traversal paths.

18. The method of claim 14, wherein generating the one or more reports indicating the destination of the emulated traversal path in the telephony network and the ingress of the emulated traversal path with respect to the telephony network comprises indicating, by the path discovery system, in the one or more reports a toll-free number (TFN) implemented by an ingress node of the telephony network and a vector-dialed number (VDN) hosted by an endpoint node of the telephony network, and wherein the call enters the telephony network via the TFN and terminates at the VDN.

19. The method of claim 14, further comprising:

obtaining, by the path discovery system, from one or more post call logs, end variable states associated with each of the one or more nodes included in the emulated traversal path, and wherein emulating the traversal path for the call through the telephony network comprises using the end variable states obtained from the one or more post call logs and associated with each of the one or more nodes included in the emulated traversal path;

determining, by the path discovery system, that the particular node of the one or more nodes included in the emulated traversal path is configured to perform an application programming interface (API) call to implement in-node routing logic; and applying, by the path discovery system, a respective end variable state of the end variable states obtained from the one or more post call logs corresponding to the particular node to parse the in-node routing logic of the particular node.

20. The method of claim 14, wherein the method further comprises storing, to a memory, respective final states of runtime variables associated with the one or more nodes included in the emulated traversal path.

* * * * *